US008765832B2

(12) United States Patent
Jacob

(10) Patent No.: US 8,765,832 B2
(45) Date of Patent: *Jul. 1, 2014

(54) POLYOLEFIN-BASED CROSSLINKED COMPOSITIONS AND METHODS OF MAKING THEM

(75) Inventor: Sunny Jacob, Seabrook, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/273,323

(22) Filed: Oct. 14, 2011

(65) Prior Publication Data

US 2013/0096222 A1 Apr. 18, 2013

(51) Int. Cl.
C08F 2/50 (2006.01)
C08F 2/46 (2006.01)
B29C 71/04 (2006.01)
C08G 61/04 (2006.01)

(52) U.S. Cl.
USPC .......... 522/46; 522/33; 522/6; 522/1; 522/71; 520/1

(58) Field of Classification Search
USPC .............................. 522/46, 33, 6, 1, 71; 520/1
See application file for complete search history.

(56) References Cited

U.S. PATENT DOCUMENTS

| | | | |
|---|---|---|---|
| 4,049,757 A | 9/1977 | Kammel et al. |
| 4,367,185 A | 1/1983 | Nojiri et al. |
| 4,540,753 A | 9/1985 | Cozewith et al. |
| 5,000,899 A | 3/1991 | Dreibelbis et al. |
| 5,560,886 A | 10/1996 | Saito et al. |
| 6,268,438 B1 | 7/2001 | Ellul et al. |
| 6,342,565 B1 | 1/2002 | Cheng et al. |
| 6,488,882 B2 | 12/2002 | Lau et al. |
| 6,500,563 B1 | 12/2002 | Datta et al. |
| 6,525,157 B2 | 2/2003 | Cozewith et al. |
| 6,548,600 B2 | 4/2003 | Walton |
| 6,559,262 B1 | 5/2003 | Waymouth et al. |
| 6,569,915 B1 | 5/2003 | Jackson et al. |
| 6,642,316 B1 | 11/2003 | Datta et al. |
| 6,667,364 B2 | 12/2003 | Abraham et al. |
| 6,770,713 B2 | 8/2004 | Hanke et al. |
| 6,881,800 B2 | 4/2005 | Friedersdorf |
| 6,890,990 B2 | 5/2005 | Cai et al. |
| 7,232,871 B2 | 6/2007 | Datta et al. |
| 7,271,209 B2 | 9/2007 | Li et al. |
| 7,390,866 B2 | 6/2008 | Datta et al. |
| 7,464,696 B2 | 12/2008 | Furusawa et al. |
| 7,605,217 B2 | 10/2009 | Datta et al. |
| 7,619,026 B2 | 11/2009 | Yang et al. |
| 7,645,415 B2 | 1/2010 | Hach |
| 7,863,364 B2 | 1/2011 | Westwood et al. |
| 7,867,433 B2 | 1/2011 | Jacob et al. |
| 7,872,075 B2 | 1/2011 | Ellul et al. |
| 2004/0024146 A1 | 2/2004 | Friedersdorf |
| 2004/0236042 A1 | 11/2004 | Datta et al. |
| 2004/0242779 A1 | 12/2004 | Cai et al. |
| 2005/0107529 A1 | 5/2005 | Datta et al. |
| 2005/0107530 A1 | 5/2005 | Datta et al. |
| 2005/0107534 A1 | 5/2005 | Datta et al. |
| 2005/0131142 A1 | 6/2005 | Datta et al. |
| 2005/0215964 A1 | 9/2005 | Autran et al. |
| 2006/0102149 A1 | 5/2006 | Furusawa et al. |
| 2006/0183861 A1 | 8/2006 | Harrington et al. |
| 2006/0293461 A1 | 12/2006 | Jiang et al. |
| 2007/0067298 A1 | 3/2007 | Stoneman |
| 2007/0083008 A1 | 4/2007 | Ellul et al. |
| 2007/0112127 A1 | 5/2007 | Soediono et al. |
| 2007/0129493 A1 | 6/2007 | Sahnoune et al. |
| 2007/0167553 A1 | 7/2007 | Westwood et al. |
| 2008/0032079 A1* | 2/2008 | Sahnoune et al. ........... 428/36.8 |
| 2008/0033107 A1 | 2/2008 | Wouters et al. |
| 2008/0188600 A1 | 8/2008 | Westwood et al. |
| 2009/0163642 A1 | 6/2009 | Kiss et al. |
| 2010/0222447 A1* | 9/2010 | Jackson et al. ................ 522/37 |

FOREIGN PATENT DOCUMENTS

| | | |
|---|---|---|
| EA | WO 98/27155 | 6/1998 |
| EP | 0 374 695 | 6/1991 |
| EP | 0 946 640 | 2/2002 |
| EP | 1 070 087 | 7/2002 |
| EP | 1 003 814 | 10/2002 |
| EP | 0 969 043 | 5/2003 |
| EP | 1 017 729 | 9/2005 |
| EP | 1 634 919 | 3/2006 |
| EP | 1 614 699 | 10/2008 |

(Continued)

OTHER PUBLICATIONS

Rudnick, L.R. et al. Eds., "Synthetic Lubricants and High-Performance Functional Fluids," Marcel Dekker, Inc., New York, pp. 409-411 (1999).

Subramanium, A., "Natural Rubber", Rubber Technology, pp. 179-208 (1995).

Ver Strate et al., "Near Monodisperse Ethylene-Propylene Copolymers by Direct Ziegler-Natta Polymerization. Preparation, Characterization, Properties", Macromolecules, vol. 21, pp. 3360-3371 (1988).

Primary Examiner — Ling Choi
Assistant Examiner — Jessica E Whiteley

(57) ABSTRACT

Provided is a method for providing a composition comprising at least one propylene-based polymer; at least one of multifunctional acrylates, multifunctional methacrylates, functionalized polybutadiene resins, functionalized cyanurate, and allyl isocyanurate; at least one of hindered phenols, phosphites, and hindered amines; and at least one photoinitiator for UV curing. The propylene-based polymer can include propylene derived units and one or more dienes, and have a triad tacticity of from 50% to 99% and a heat of fusion of less than 80 J/g. The composition can be extruded and crosslinked. The crosslinked composition is particularly useful for making films and fibers.

22 Claims, No Drawings

(56) References Cited

FOREIGN PATENT DOCUMENTS

| | | |
|---|---|---|
| EP | 1 223 191 | 6/2009 |
| WO | WO 00/01766 | 1/2000 |
| WO | WO 00/69963 | 11/2000 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/014988 | 2/2004 |
| WO | WO 2005/049672 | 6/2005 |
| WO | WO 2006/102149 | 9/2006 |
| WO | WO 2007/067298 | 6/2007 |
| WO | WO 2007/084219 | 7/2007 |
| WO | WO 2008/016467 | 2/2008 |
| WO | WO 2008/016518 | 2/2008 |
| WO | WO 2008/094741 | 8/2008 |
| WO | WO 2009/154866 | 12/2009 |
| WO | WO 2011/041230 | 4/2011 |

\* cited by examiner

POLYOLEFIN-BASED CROSSLINKED COMPOSITIONS AND METHODS OF MAKING THEM

CROSS-REFERENCE TO RELATED APPLICATIONS

This application is related to U.S. patent application Ser. No. 12/130,745, filed May 30, 2008, now U.S. Pat. No. 7,867,433, incorporated herein by reference in its entirety. This application is related to U.S. patent application Ser. No. 13/273,333, filed Oct. 14, 2011, which is a continuation-in-part of International Application No. PCT/US2010/050243, filed Sep. 24, 2010, which claims the benefit of U.S. Provisional Patent Application No. 61/248,190, filed Oct. 2, 2009, the disclosure of all of which is incorporated herein by reference in their entirety.

FIELD OF THE INVENTION

Embodiments of the invention relate to crosslinked compositions, articles, and methods for making same. More particularly, embodiments of the invention relate to crosslinking propylene-based polymers by ultraviolet radiation, and compositions and articles made therefrom.

BACKGROUND OF THE INVENTION

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated-wear clothing or garments must maintain their integrity and elastic performance after laundering.

Spandex™, a segmented polyurethane urea elastic material, is currently used in various durable fabrics. For example, fibers made from Spandex™ have been used in launderable apparels, fabrics, durable and disposable furnishing, beddings, etc. Similar to conventional uncrosslinked polyolefin-based elastic materials, articles made from Spandex™ can lose integrity, shape, and elastic properties when subjected to elevated temperatures. Thus, Spandex™ is not suitable for many co-knitting applications with high temperature fibers, such as polyester fibers.

Propylene-based polymers having good elastic properties are known and have been used for stretchable clothing. See, for example, U.S. Pat. Nos. 6,525,157 and 6,342,565. U.S. Pat. No. 6,342,565, in particular, discloses a soft, set-resistant, annealed fiber comprising a blend of polyolefins. The blend has a flexural modulus less than or equal to 12,000 psi and includes from 75 to 98 wt % of a first polymer component and from 2 to 25 wt % of a second polymer component. The first polymer component is a propylene-ethylene polymer having at least 80 wt % propylene and up to 20 wt % ethylene, a melting point by DSC in the range of from 25 to 70° C., and a heat of fusion less than 25 J/g. The second polymer component is a stereoregular isotactic polypropylene having a melting point by DSC of greater than 130° C., and a heat of fusion greater than 120 J/g. The fiber exhibits a resistance to set equal to or less than 80% from a 400% tensile deformation. The polyolefin blend is said to be substantially non-crosslinked.

U.S. Pat. No. 6,500,563 discloses blends of two different types of polypropylene, including blends made from a polypropylene having a Tm of less than 110° C. and propylene-ethylene copolymer that has isotactically arranged propylene derived sequences and Tm less than 105° C.

Three component blends of isotactic polypropylene, impact modifying amounts of an ethylene-propylene based rubber or low density ethylene copolymer and a propylene-based elastomer as compatibilizer are described in EP 946640, EP 946641, EP 969043 and EP 1098934.

WO 04/014988 describes blends of isotactic polypropylene with non-functionalized plasticizers such as poly-alpha-olefins. WO 03/040233 also discloses two component blends with the isotactic polypropylene as the predominant, matrix phase and the propylene-based copolymer serving as an impact modifier.

EP 1003814 and U.S. Pat. No. 6,642,316 disclose two-component blends of small amounts of isotactic polypropylene and predominant amounts of an ethylene based elastomer. EP 0374695 discloses visually homogeneous two component blends however using 40 wt % or less of the propylene-based copolymer. WO 00/69963 describes films made of two-component blends with from 75 to 98 wt % of a propylene ethylene based elastomer having a heat of fusion of less than 25 J/g.

Other related references include U.S. Publication Nos. 2006/102149; 2005/0107529; 2005/0107530; 2005/0131142; and 2005/0107534.

U.S. Pat. No. 7,867,433 discloses methods for making a crosslinked elastomeric composition and articles made therefrom. For example, an elastomeric composition comprising at least one propylene-based polymer is blended with at least one of multifunctional acrylates, multifunctional methacrylates, functionalized polybutadiene resins, functionalized cyanurate, and allyl isocyanurate; and blended with at least one of hindered phenols, phosphites, and hindered amines. The propylene-based polymer can include propylene derived units and one or more dienes, and have a triad tacticity of from 50% to 99% and a heat of fusion of less than 80 J/g. The blended composition can then be extruded and crosslinked. The extruded polymer can be crosslinked using electron beam radiation having an e-beam dose of about 100 KGy or less. The crosslinked polymers are described to be particularly useful for making fibers and films.

There is still a need for new and improved propylene-based materials requiring good stretchability and elasticity.

SUMMARY OF THE INVENTION

Methods for making a crosslinked composition and articles made therefrom are provided. The crosslinked composition can be made by combining one or more propylene-based polymers, one or more antioxidants, one or more co-agents, and one or more photoinitiators, and when crosslinked, such as by ultraviolet curing, surprisingly and unexpectedly exhibits little to no loss in tensile strength. Furthermore, the crosslinked composition surprisingly and unexpectedly exhibits excellent properties for making films and fibers. The composition can optionally include one or more polyolefinic thermoplastic resins and/or optionally one or more secondary elastomeric components.

In one embodiment, a composition, preferably an elastomeric composition, comprising at least one propylene-based polymer is combined (e.g., blended) with at least one of multifunctional acrylates, multifunctional methacrylates, functionalized polybutadiene resins, functionalized cyanurate, and allyl isocyanurate; at least one of hindered phenols, phosphites, and hindered amines; and at least one photoinitiator. The propylene-based polymer can include propylene derived units and one or more dienes, and have a triad tacticity of from 50% to 99% and a heat of fusion of less than 80 J/g.

In one embodiment, the invention encompasses a method for making a crosslinked composition comprising the steps of:

(a) providing a composition comprising: (i) from about 60 to about 95 wt % of at least one propylene-based polymer comprising propylene-derived units and one or more dienes, the propylene-based polymer having a triad tacticity of from 50% to 99% and a heat of fusion of less than 80 J/g; (ii) at least one of multifunctional acrylates, multifunctional methacrylates, functionalized polybutadiene resins, functionalized cyanurate, and allyl isocyanurate, preferably in an amount of from about 0.1 to about 15 wt %; (iii) at least one of hindered phenols, phosphates, and hindered amines, preferably in an amount of from about 0.1 to about 5 wt %; and (iv) at least one photoinitiator, preferably an ultraviolet (UV) photoinitiator, and preferably in an amount of from about 0.1 to about 5 wt %;

(b) extruding the composition; and
(c) crosslinking the composition, preferably using ultraviolet radiation.

In another embodiment, the invention encompasses a method for making a crosslinked composition comprising the steps of:

(a) providing a composition comprising: (i) at least one propylene-based polymer comprising propylene-derived units and optionally one or more dienes, the propylene-based polymer having a triad tacticity of from 50% to 99% and a heat of fusion of less than 80 J/g; (ii) from about 0.1 to about 5 wt % of at least one ultraviolet photoinitiator selected from the group consisting of a benzophenone photoinitiator; a phenylglyoxylate photoinitiator; an alpha hydroxy ketone photoinitiator; a combination of acyl phosphine oxide and an alpha hydroxy ketone photoinitiator; 2,2-aimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester;

(b) extruding the composition; and
(c) crosslinking the composition using ultraviolet radiation.

In another embodiment, the invention encompasses a method for making a crosslinked composition comprising the steps of:

(a) providing a composition comprising: (i) from about 60 to about 95 wt % of at least one propylene-based polymer comprising propylene-derived units and one or more dienes, the propylene-based polymer having a triad tacticity of from 50% to 99% and a heat of fusion of less than 80 J/g; (ii) from about 1 to about 20 wt % of a at least one of a polypropylene homopolymer and polypropylene-ethylene copolymer; and (iii) from about 0.1 to about 5 wt % of at least one photoinitiator, preferably a UV photoinitiator;

(b) extruding the composition; and
(c) crosslinking the composition, preferably using ultraviolet radiation.

Preferably, compositions of the invention are crosslinked by UV radiation at about 100 to about 400 nm. Preferably, the photoinitiator is a UV photoinitiator, preferably at least one of a benzophenone photoinitiator, a phenylglyoxylate photoinitiator, an alpha hydroxy ketone photoinitiator, a combination of acyl phosphine oxide and an alpha hydroxy ketone photoinitiator; 2,2-aimethoxy-1,2-diphenylethan-1-one, and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. Preferably, the crosslinked composition after UV radiation has an Elongation at Break of at least about 700%, or at least about 800%.

The crosslinking recited in step (c) can occur at any stage from the composition to the extrusion or formation or an article, i.e., the composition of step (a) can be crosslinked before, during or after extrusion, and can also be crosslinked before, during or after formation of an article comprising the composition. The composition can also be crosslinked, in addition to by UV or other radiation, using electron beam radiation having an e-beam dose before, simultaneously with, or after ultraviolet or other radiation. The crosslinked composition is particularly useful for making articles such as films and fibers.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Propylene-Based Polymer

The propylene-based polymer can be one or more propylene-$\alpha$-olefin-diene terpolymers or propylene-diene copolymers. For simplicity and ease of description, however, the terms "propylene-based polymer" and "propylene copolymer" and "PCP" as used herein will refer to both propylene-$\alpha$-olefin-diene terpolymers and propylene-diene copolymers.

In at least one specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ $\alpha$-olefin, or a combination of ethylene and at least one $C_4$-$C_{20}$ $\alpha$-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ $\alpha$-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene- 2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO 03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP 1070087. The catalyst described in EP 1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is ethylene, butene, hexene or octene. In other embodiments, two alpha-olefins are present, preferably ethylene and one of butene, hexene or octene.

Preferably, the propylene-based polymer comprises about 0.2 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.2 wt % to about 10 wt %, more preferably from about 0.2 to about 5 wt %, more preferably from about 0.2 wt % to about 4 wt %, preferably from about 0.2 wt % to about 3.5 wt %, preferably from about 0.2 wt % to about 3.0 wt %, and preferably from about 0.2 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present, the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju, and Ver Strate) (which is incorporated by reference herein for purposes of U.S. practices) and references cited therein, in Macromolecules, 1988, Volume 21, pp. 3360-3371 (Ver Strate et al.), which is herein incorporated by reference for purposes of U.S. practice, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_1 = KM_v^\alpha$, K and α were measured values for linear polymers and should be obtained on the same instrument as the one used for the g' index measurement.

In one or more embodiments above or elsewhere herein, the propylene-based polymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per the ASTM D-1505 test method.

In one or more embodiments above or elsewhere herein, the propylene-based polymer can have a melt flow rate (MFR, 2.16 kg weight 230° C.), equal to or greater than 0.2 g/10 min as measured according to the ASTM D-1238(A) test method as modified (described below). Preferably, the MFR (2.16 kg 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene-based polymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or J/g, or 50 J/g, or 60 J/g or 70 J/g, or 75 J/g, or 80 J/g.

The crystallinity of the propylene-based polymer can also be expressed in terms of percentage of crystallinity (i.e., % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 209 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning Calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning Calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}$C NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 2004/0236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene-based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1233191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1614699 or EP 1017729.

In some embodiments, the propylene-based polymer can be a polymer blend formed from two or more polymers produced in two or more reactors and to processes for manufacturing such a polymer blend, such as those described in WO 2010/041230.

Grafted (Functionalized) Backbone

In one or more embodiments, the propylene-based polymer can be grafted (i.e. "functionalized") using one or more grafting monomers. As used herein, the term "grafting" denotes covalent bonding of the grafting monomer to a polymer chain of the propylene-based polymer.

The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt. %, preferably at least about 0.5 wt % and highly preferably about 1.5 wt %.

Styrene and derivatives thereof such as paramethyl styrene, or other higher alkyl substituted styrenes such as t-butyl styrene can be used as a charge transfer agent in presence of the grafting monomer to inhibit chain scissioning. This allows further minimization of the beta scission reaction and the production of a higher molecular weight grafted polymer (MFR=1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

In one or more embodiments, the grafted polymer can be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiator include but are not limited to: diacyl peroxides such as benzoyl peroxide; peroxyesters such as tert-butylperoxy benzoate, tert-butylperoxy acetate, OO-tert-butyl-O-(2-ethylhexyl)monoperoxy carbonate; peroxyketals such as n-butyl-4,4-di-(tert-butyl peroxy) valerate; and dialkyl peroxides such as 1,1-bis(tertbutylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, Di-(2-tert-butylperoxy-isopropyl-(2)) benzene, di-tert-butylperoxide (DTBP), 2,5-dimethyl-2,5-di (tert-butylperoxy)hexane, 2,5-dimethyl-2,5-di(tert-butylperoxy)hexyne, 3,3,5,7,7-pentamethyl 1,2,4-trioxepane; and the like.

Polyolefinic Thermoplastic Resin

The composition can further comprise, in addition to the propylene-based elastomer, a polyolefinic thermoplastic resin. The term "polyolefinic thermoplastic resin" as used herein refers to any material that is not a "rubber" and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non crosslinked.

In one or more embodiments, the polyolefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or s syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of to 30 g/10 min. Others have a lower MFR, e.g., "fractional" polypropylenes which have an MFR less than 1.0. Those with high MFR can be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In one or more embodiments, the random polypropylene has a 1% secant modulus of about 100 kPsi to about 200 kPsi, as measured according to ASTM D790A. In one or more embodiments, the 1% secant modulus can be 140 kPsi to 170 kPsi, as measured according to ASTM D790A. In one or more embodiments, the 1% secant modulus can be 140 kPsi to 160 kPsi, as measured according to ASTM D790A. In one or more embodiments, the 1% secant modulus can range from a low of about 100, 110, or 125 kPsi to a high of about 145, 160, or 175 kPsi, as measured according to ASTM D790A.

In one or more embodiments, the random polypropylene can have a density of about 0.85 to about 0.95 g/cc, as measured by ASTM D792. In one or more embodiments, the random polypropylene can have a density of about 0.89 g/cc to 0.92 g/cc, as measured by ASTM D792. In one or more embodiments, the density can range from a low of about 0.85, 0.87, or 0.89 g/cc to a high of about 0.90, 0.91, 0.92 g/cc, as measured by ASTM D792

Other polymers that may be included in the compositions of the invention include isotactic poly(1-butene), such as PB0110M available from Basell Polyolefins.

Additional Elastomeric Component

The composition can optionally include one or more additional elastomeric components, referred to herein as a "secondary elastomeric component." In at least one specific embodiment, the secondary elastomeric component can be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

In one or more embodiments, the EP can include one or more optional polyenes, including particularly a diene; thus, the EP can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of EP or EPDM copolymers include V722, V3708P, MDV 91-9, V878 that are available under the trade name Vistalon™ from ExxonMobil Chemicals. Several commercial EPDM are available from DOW under the trade Nordel IP amd MG grades). Certain rubber components (e.g., EPDMs, such as Vistalon™ 3666 EPDM) include additive oil that is preblended before the rubber component is combined with the thermoplastic. The type of additive oil utilized will be that customarily used in conjunction with a particular rubber component.

Examples of the optional polyene include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene.

In another embodiment, the secondary elastomeric component can include, but is not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE), polyisoprene rubber, polybutadiene rubber, isoprene butadiene rubber (IBR), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-alkylstyrene), preferably isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. Preferred secondary elastomeric components include hydrogenated styrene-butadiene-styrene block copolymer (SEBS), and hydrogenated styrene-isoprene-styrene block copolymer (SEPS).

The secondary elastomeric component can also be or include natural rubber. Natural rubbers are described in detail by Subramaniam in RUBBER TECHNOLOGY, pp. 179-208 (1995). Suitable natural rubbers can be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

The secondary elastomeric component can also be or include one or more synthetic rubbers. One suitable commercially available synthetic rubber include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

The secondary elastomeric component can be present in a range from up to 50 phr in one embodiment, from up to 40 phr in another embodiment, and from up to 30 phr in yet another embodiment. In one or more embodiments, the amount of the secondary rubber component can range from a low of about 1, 7, or 20 phr to a high of about 25, 35, or 50 phr.

Additive Oil

The composition can optionally include one or more additive oils. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectaSyn™ and Elevast™, both supplied by ExxonMobil Chemical Company).

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and thermoplastic components. The amount of additive oil may also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount may in certain cases be the combined amount of process oil and extender oil. The ratio may range, for example, from about 0 to about 4.0/1. Other ranges, having any of the following lower and upper limits, may also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Polybutene oils are preferred. Preferable polybutene oils have an Mn of less than 15,000, and include homopolymer or copolymer of olefin derived units having from 3 to 8 carbon atoms and more preferably from 4 to 6 carbon atoms. In one or more embodiments, the polybutene is a homopolymer or copolymer of a $C_4$ raffinate. An embodiment of preferred low molecular weight polymers termed "polybutene" polymers is described in, for example, SYNTHETIC LUBRICANTS AND HIGH-PERFORMANCE FUNCTIONAL FLUIDS, pp. 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having at least isobutylene derived units, and optionally 1-butene derived units, and/or 2-butene derived units. In one embodiment, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer. Commercial examples of a suitable processing oil includes the PARAPOL™ Series of processing oils or Polybutene grades or Indopol™ from Soltex Synthetic Oils and Lubricants or from BP/Innovene.

The processing oil or oils can be present at 1 to 60 phr in one embodiment, and from 2 to 40 phr in another embodiment, from 4 to 35 phr in another embodiment, and from 5 to 30 phr in yet another embodiment.

Co-Agents

The composition can optionally include one or more co-agents. Suitable co-agents can include liquid and metallic multifunctional acrylates and methacrylates, functionalized polybutadiene resins, functionalized cyanurate, and allyl isocyanurate. More particularly, suitable co-agents can include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate, azobisisobutyronitrile and the like, and combinations thereof. Commercially available co-agents can be purchased from Sartomer.

In one or more embodiments, the composition contains at least 0.1 wt % of co-agent based on the total weight of the composition. In one or more embodiments, the amount of co-agent(s) can range from about 0.1 wt % to about 15 wt %, based on the total weight of the composition. In one or more embodiments, the amount of co-agent(s) can range from a low of about 0.1 wt %, 1.5 wt % or 3.0 wt % to a high of about 4.0 wt %, 7.0 wt %, or 15 wt %, based on the total weight of the composition. In one or more embodiments, the amount of co-agent(s) can range from a low of about 2.0 wt %, 3.0 wt % or 5.0 wt % to a high of about 7.0 wt %, 9.5 wt %, or 12.5 wt %, based on the total weight of the composition. In one or more embodiments, the amount of co-agent(s) is about 3 wt %, based on the total weight of the composition.

Antioxidants

The composition can optionally include one or more anti-oxidants. Suitable anti-oxidants can include hindered phenols, phosphites, hindered amines, Irgafos 168, Irganox 1010, Irganox 3790, Irganox B225, Irganxo 1035, Irgafos 126, Irgastab 410, Chimassorb 944, etc., available from Ciba Geigy, now BASF Chemical Company. These may be added to the composition to protect against degradation during shaping or fabrication operation and/or to better control the extent of chain degradation.

In one or more embodiments, the composition contains at least 0.1 wt % of antioxidant, based on the total weight of the composition. In one or more embodiments, the amount of antioxidant(s) can range from about 0.1 wt % to about 5 wt %, based on the total weight of the composition. In one or more embodiments, the amount of antioxidant(s) can range from a low of about 0.1 wt %, 0.2 wt % or 0.3 wt % to a high of about 1 wt %, 2.5 wt %, or 5 wt %, based on the total weight of the composition. In one or more embodiments, the amount of antioxidant(s) is about 0.1 wt %, based on the total weight of the composition. In one or more embodiments, the amount of antioxidant(s) is about 0.2 wt %, based on the total weight of the composition. In one or more embodiments, the amount of antioxidant(s) is about 0.3 wt %, based on the total weight of the composition. In one or more embodiments, the amount of antioxidant(s) is about 0.4 wt %, based on the total weight of the composition. In one or more embodiments, the amount of antioxidant(s) is about 0.5 wt %, based on the total weight of the composition Photoinitiators The composition can optionally include one or more photoinitiators, particularly those suitable for UV curing. Suitable photoinitiators include those that effect crosslinking after being excited by a photon, and may include those that effect crosslinking after exposure to visible, UV radiation, and/or x-ray radiation.

Suitable photoinitiators may be selected from those organic chemical compounds conventionally employed to promote UV-initiated formation of radicals either by intramolecular homolytic bond cleavage or by intermolecular hydrogen abstraction. Such agents include organic compounds having aryl carbonyl or tertiary amino groups. Among the compounds suitable for use are benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; benzil dimethoxyketal; benzoin methyl ether; and phenyl glyoxal. Upon exposure to UV radiation, a variety of photochemical transformations may occur, for example, the UV initiator may form free radical reactive fragments that react with the acrylate end groups of the multifunctional acrylic or methacrylic crosslinking agent. This initiates crosslinking of the polymer as well as homopolymerization of the acrylic or methacrylic crosslinking agent.

In one embodiment, the photoinitiator is a UV photoinitiator. Preferably, the photoinitiator includes at least one of a benzophenone photoinitiator; a phenylglyoxylate photoinitiator; an alpha hydroxy ketone photoinitiator; a combination of acyl phosphine oxide and an alpha hydroxy ketone photoinitiator; 2,2-aimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. Commercially available photoinitiators include Darocur BP, Darocur MBF, Irgacure 651 (Alpha, alpha-dimethoxy-alpha-phenylacetophenone), and Irgacure 754 (oxy-phenyl-acetic acid 2-[2 oxo-2 phenyl-acetoxy-ethoxy]-ethyl ester and oxy-phenyl-acetic 2-[2-hydroxy-ethoxy]-ethyl ester), available from Ciba Geigy, now BASF Chemical Company.

Additional examples of commercially available photoinitiators include Irgacure 184 (1-hydroxy-cyclohexyl-phenyl-ketone), Irgacure 500 (Irgacure 184 at 50 wt %, benzophenone at 50 wt %); Darocur 1173 (2-hydroxy-2-methyl-1-phenyl-1-propanone), Irgaur 2959 (2-hydroxy-1-[4-(2-hydroxyethoxy)phenyl]-2-methyl-1-propanone), Darocur MBF (methylbenzoylformate), Irgacure 369 (2-benzyl-2-(dimethylamino)-1-[4-(4-morpholinyl)phenyl]-1-butanone), Irgacure 907 (2-methyl-1-[4-(methylthio)phenyl]-2-(4-morpholinyl)-1-propanone), Irgacure 1300 (Irgacure 369 at 30 wt %, Irgacure 651 at 70 wt %), Darocur TPO (diphenyl(2,4,6-trimethylbenzoyl)-phosphine oxide), Darocur 4265 (Darocur TPO at 50 wt % and Darocur 1173 at 50 wt %), Irgacure 819 (phosphine oxide, phenyl bis(2,4,6-trimethyl benzoyl)), Irgacure 819DW (Irgacure 819 at 45% active, dispersed in water), Irgacure 2022 (Irgacure 819 at 20 wt % and Darocur 1173 at 80 wt %), Irgacure 2100 (phosphine oxide), Irgacure 784 (bis(eta 5-2,4-cyclopentadien-1-yl)bis[2,6-difluoro-3-(1H-pyrrol-1-yl)phenyl]titanium), and Irgacure 250 (iodonium, (4-methylphenyl) [4-(2-methylpropyl)phenyl]-, hexafluorophosphate(1-)), also available from Ciba Geigy, now BASF Chemical Company (see, e.g., Brochure: Photoinitiators for UV Curing, Key Products Selection Guide, Ciba Specialty Chemicals, October 2003).

In one or more embodiments, the composition contains at least 0.1 wt % of photoinitiator, based on the total weight of the composition. In one or more embodiments, the amount of photoinitiator(s) can range from about 0.1 wt % to about 10 wt %, based on the total weight of the composition. In one or more embodiments, the amount of photoinitiator(s) can range from a low of about 0.1 wt %, 0.2 wt %, 0.3 wt %, 0.5 wt %, or 1 wt %, to a high of about 2.5 wt %, 3 wt %, 5 wt %, or 8 wt %, based on the total weight of the composition. In one or more embodiments, the amount of photoinitiator(s) is about 1 wt % to about 3 wt %, based on the total weight of the composition. In one or more embodiments, the amount of photoinitiator(s) is about 1 wt %, 1.5 wt %, or 2 wt %, based on the total weight of the composition.

Blending and Additives

In one or more embodiments, the individual materials and components, such as the propylene-based polymer and optionally the one or more polyolefinic thermoplastic resins (e.g. propylene homopolymer or copolymer), secondary elastomeric component, additive oil, co-agents, anti-oxidants, and UV photoinitiators can be combined such as by melt-mixing to form a blend. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM).

In one or more embodiments, the composition can include the propylene-based polymer in an amount ranging from a low of about 60, 70, or 75 wt % to a high of about 80, 90, or 95 wt %. In one or more embodiments, the composition can include the one or more polyolefinic thermoplastic components in an amount ranging from a low of about 5, 10, or 20 wt % to a high of about 25, 30, or 75 wt %. In one or more embodiments, the composition can include the secondary elastomeric component in an amount ranging from a low of about 5, 10, or 15 wt % to a high of about 20, 35, or 50 wt %.

In one or more embodiments, the co-agents, antioxidants, UV photoinitiators, and/or other additives can be introduced at the same time as the other polymer components or later downstream in case of using an extruder or Buss kneader or only later in time. Other additives can include antiblocking agents, antistatic agents, ultraviolet stabilizers, foaming agents, and processing aids. The additives can be added to the blend in pure form or in master batches.

Cured Products

The formed article (e.g., extruded article) can be a fiber, yarn or film, and is at least partially crosslinked or cured. Preferably, the formed article is at least partially crosslinked or cured so that the article becomes heat-resistant. As used herein, the term "heat-resistant" refers to the ability of a polymer composition or an article formed from a polymer composition to pass the high temperature heat-setting and dyeing tests described herein. As used herein, the terms "cured," "crosslinked," "at least partially cured," and "at least partially crosslinked" refer to a composition having at least 2 wt % insolubles based on the total weight of the composition. In one or more embodiments, the compositions described herein can be cured to a degree so as to provide at least 3 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles using Xylene as the solvent by Soxhlet extraction.

In one embodiment, crosslinking can be accomplished by exposure to UV radiation. The wavelength spectrum of radiation used to effect the curing reaction typically corresponds to the absorption maximum of the UV initiator. The wavelength can be from about 10 nm to about 400 nm. Preferably, the wavelength is from about 100 to about 400 nm, preferably about 200 to about 350 nm. Suitable UV radiation sources include medium pressure mercury vapor lamps, electrodeless lamps, pulsed xenon lamps, and hybrid xenon/mercury vapor lamps. An exemplary arrangement comprises one or more lamps together with a reflector, which diffuses the radiation evenly over the surface to be irradiated. Suitable UV radiation equipment include those available from Fusion UV System Inc., such as the F300-6 curing chamber.

In some embodiments, crosslinking can be accomplished by further exposure to electron beam ("ebeam") before or after exposure to UV radiation. Suitable ebeam equipment is available from E-BEAM Services, Inc. In a particular embodiment, electrons are employed at a dosage of about 100 kGy or less in multiple exposures. The source can be any electron beam generator operating in a range of about 150 Key to about 12 mega-electron volts (MeV) with a power output capable of supplying the desired dosage. The electron voltage can be adjusted to appropriate levels which may be, for example, 100,000; 300,000; 1,000,000; 2,000,000; 3,000,000; 6,000,000. A wide range of apparatus for irradiating polymers and polymeric articles is available.

Effective irradiation is generally carried out at a dosage between about 10 kGy (Kilogray) to about 350 kGy, preferably from about 20 to about 350 kGy, or from about 30 to about 250 kGy, or from about 40 to about 200 kGy. In a particular aspect of this embodiment, the irradiation is carried out at room temperature.

In another embodiment, crosslinking can be accomplished in addition to the UV radiation by exposure to one or more chemical agents. Illustrative chemical agents include but are not limited to peroxides and other free radical generating agents, sulfur compounds, phenolic resins, and silicon hydrides. In a particular aspect of this embodiment, the crosslinking agent is either a fluid or is converted to a fluid such that it can be applied uniformly to the article. Fluid crosslinking agents include those compounds which are gases (e.g., sulfur dichloride), liquids (e.g., Trigonox C, available from Akzo Nobel), solutions (e.g., dicumyl peroxide in acetone, or suspensions thereof (e.g., a suspension or emulsion of dicumyl peroxide in water, or redox systems based on peroxides).

Illustrative peroxides include, but are not limited to dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate. When used, peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy) valerate, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used.

In one or more embodiments, the crosslinking can be carried out using hydrosilylation techniques.

In one or more embodiments, the crosslinking can be carried out under an inert or oxygen-limited atmosphere. Suitable atmospheres can be provided by the use of helium, argon, nitrogen, carbon dioxide, xenon and/or a vacuum.

Crosslinking either by chemical agents or by irradiation can be promoted with a crosslinking catalyst, such as organic bases, carboxylic acids, and organometallic compounds including organic titanates and complexes or carboxylates of lead, cobalt, iron, nickel, zinc, and tin (such as dibutyltindilaurate, dioctyltinmaleate, dibutyltindiacetate, dibutyltindioctoate, stannous acetate, stannous octoate, lead naphthenate, zinc caprylate, cobalt naphthenate, and the like).

EXAMPLES

The foregoing discussion can be further described with reference to the following non-limiting examples. Elastomeric compositions containing at least one propylene-based copolymer in accordance with one or more embodiments described were prepared.

Table 1 summarizes the formulations of the compositions. Each composition was prepared in a Brabender thermoplastic compounder at a mixing temperature of 150° C. for 3 minutes at 40 rpm, followed by a cooling temperature of 140° C. for about 2 minutes.

SLTD1060 is a metallocene-catalyzed propylene/ethylene copolymer having 16 wt % of ethylene, 2.5 wt % ENB, a heat of fusion of less than 80 J/g, and a triad tacticity of from 50% to 99%. It has a melting point of less than 50° C., Mooney viscosity (ML (1+4) at 125° C.) or 17.5 as measured according to a method based on ASTM D 1646, and MFR (2.16 kg at 230° C.) of 4 g/10 min.

VM6102 is a metallocene-catalyzed propylene/ethylene copolymer having 16 wt % of ethylene and is commercially available from ExxonMobil Chemical Company under the tradename Vistamaxx™ 6102 propylene-based elastomer.

PP 5341 is a 0.8 MFR (230° C., 2.16 kg) isotactic polypropylene (iPP) that is commercially available from ExxonMobil Chemical Company.

PP 9122 is a random copolymer containing 2-3 wt % of ethylene derived units, the balance is propylene. The PP 9122 has a MFR (2.16 kg at 230° C.) of 2.1 g/10 min and a density of 0.9 g/cm³. The 1% secant flexural modulus is 140 kPsi, as measured by ASTM D790A. PP 9122 is commercially available from ExxonMobil Chemical Company.

Sartomer 350 is a trimethylolpropane trimethacrylate co-agent that is commercially available from Sartomer Company, Inc. located in Exton, Pa.

Irgafos 168 is an antioxidant commercially available from Ciba Specialty Chemicals.

MDV 91-9 is an EP copolymer (ExxonMobil Chemical) with about 60 wt % ethylene and has a Mooney viscosity (ML (1+4) at 125° C.) about 19 and narrow molecular weight distribution.

Darocur BP is a benzophenone UV photoinitiator that is commercially available from Ciba Geigy/BASF Chemical Company.

Darocur MBF is a phenylglyoxylate UV photoinitiator that is commercially available from Ciba Geigy/BASF Chemical Company.

Darocur ITX is a UV photoinitiator that is commercially available from Ciba Geigy/BASF Chemical Company.

Irgacure 651 is a UV photoinitiator (2,2-dimethoxy-1,2-diphenylethan-1-one) that is commercially available from Ciba Geigy/BASF Chemical Company Irgacure 754 is a UV photoinitiator (mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester) that is commercially available from Ciba Geigy/BASF Chemical Company.

TABLE 1

Formulations in weight percent

| | Wt Percent | | | | | | | |
|---|---|---|---|---|---|---|---|---|
| | Comparative | | | | | | | |
| Material | 1 | 2 | 3 | 4 | 5 | 6 | 7 | 8 |
| SLTD 1060 | 95.00% | 95.00% | 93.00% | 93.00% | 93.00% | 93.00% | 93.00% | 89.80% |
| PP 5341 | 5.00% | | 5.00% | 5.00% | 5.00% | 5.00% | 5.00% | 5.00% |
| Sartomer 350 | | | | | | | | 3.00% |
| Irgafos 168 | | | | | | | | 0.20% |
| PP 9122 | | 5.00% | | | | | | |
| Darocur BP | | | 2.00% | | | | | 2.00% |
| Darocur MBF | | | | 2.00% | | | | |
| Darocur ITX | | | | | 2.00% | | | |
| Irgacure 651 | | | | | | 2.00% | | |
| Irgacure 754 | | | | | | | 2.00% | |
| VM6102 | | | | | | | | |
| MDV 91-9 | | | | | | | | |
| Total Weight percent | 100.00% | 100.00% | 100.00% | 100.00% | 100.00% | 100.00% | 100.00% | 100.00% |

| | Wt Percent | | | | | |
|---|---|---|---|---|---|---|
| | | | Comparative | | | Comparative |
| Material | 9 | 10 | 11 | 12 | 13 | 14 |
| SLTD 1060 | 89.80% | 89.80% | | | 79.80% | |
| PP 5341 | 5.00% | | | | | |
| Sartomer 350 | 3.00% | 3.00% | | 3.00% | 3.00% | 3.00% |
| Irgafos 168 | 0.20% | 0.20% | | 0.20% | 0.20% | 0.20% |
| PP 9122 | | 5.00% | 5.00% | 5.00% | 5.00% | 5.00% |
| Darocur BP | | | | | | |
| Darocur MBF | | | | | | |
| Darocur ITX | 2.00% | 2.00% | | 2.00% | 2.00% | 2.00% |
| Irgacure 651 | | | | | | |
| Irgacure 754 | | | | | | |
| VM6102 | | | 95.00% | 89.80% | | 79.80% |
| MDV 91-9 | | | | | 10.00% | 10.00% |
| Total Weight percent | 100.00% | 100.00% | 100.00% | 100.00% | 100.00% | 100.00% |

The blended compositions were then extruded and compression molded into plaques. The plaques were then crosslinked using a F300-6 UV curing chamber by Fusion UV System, Inc. An Hg lamp bulb (200-350 nm) was used as the UV source. 2 mm plaque and 10 mm film samples were used for radiation crosslinking.

The 2 mm-plaque samples were crosslinked at two conditions:

65 ft/min (10668 m/min) 1 pass;

65 ft/min 2 passes, $2^{nd}$ pass after flipping the sample.

The 10-mm film samples were crosslinked at two conditions:

65 ft/min 1 pass;

65 ft/min 2 pass, $2^{nd}$ pass after flipping the sample;

100 ft/min (30.48 m/min) 2 passes, $2^{nd}$ pass after flipping the sample. At 65 ft/min the exposure was 0.147 J/cm². At 100 ft/min the exposure was 0.103 J/cm². The temperature on the sample rose to ~80° C. upon exposure to UV radiation.

Physical properties of the plaques before and after curing were evaluated. Test methods included ASTM 2240 for Shore A Hardness, ASTM D412 for Stress at break, ASTM D412 for Elongation at Break, and ASTM D412 for 100% Mod(Mpa), and ASTM D412 for Energy to Break. The tension set of the blends were tested according to ASTM D412 at room temperature and 70° C. For room temperature and 70° C. testing for tension set the sample was aged at the test temperature for 30 minutes under 50% tension on Jig and annealed at room temperature for 30 minute after removing from the Jig.

Tables 2 and 3 summarize the physical properties of the plaque samples before and after UV curing.

TABLE 2

Mechanical properties of uncured plaques.

| TESTED PROPERTIES (compression molded plaques at PSL) Before UV curing | Comparative 1 | 2 | 3 | 4 | 5 | 6 | 7 | 8 | 9 | 10 | Comparative 11 | 12 | Comparative 13 | Comparative 14 |
|---|---|---|---|---|---|---|---|---|---|---|---|---|---|---|
| Hardness, Shore A, 15 s. | 59 | 59 | 58 | 59 | 57 | 59 | 58 | 52 | 52 | 54 | 55 | 51 | 64 | 59 |
| Stress at Break, MPa | 5.4 | 11.6 | 9.2 | 9.5 | 9.7 | 10.0 | 10.1 | 9.8 | 9.8 | 9.9 | 9.9 | 8.9 | 11.6 | 7.0 |
| Elongation at break, (%) | 741 | 962 | 976 | 967 | 989 | 975 | 969 | 1011 | 1011 | 1011 | 1012 | 1013 | 1011 | 1012 |
| 100% Mod. (MPa) | 1.6 | 1.7 | 1.4 | 1.5 | 1.4 | 1.5 | 1.5 | 1.4 | 1.4 | 1.4 | 1.5 | 1.3 | 1.9 | 1.5 |
| Energy to Break, J | 6.3 | 12.1 | 10.7 | 11.0 | 10.5 | 10.9 | 11.1 | 10.5 | 10.4 | 11.3 | 10.8 | 8.8 | 15.2 | 11.2 |
| MFR (230 C., 2.16 kg) (SEB) | 3.7 | 3.9 | 4.9 | 6.1 | 3.4 | 4.8 | 4.2 | 5.1 | 4.8 | 5.0 | 3.4 | 3.6 | 5.8 | 4.4 |

TABLE 3

Mechanical properties of cured plaques.

| TESTED PROPERTIES (compression molded plaques at PSL) | Comparative 1 | 2 | 3 | 4 | 5 | 6 | 7 | 8 | 9 | 10 | Comparate 11 | 12 | Comparative 13 | Comparative 14 |
|---|---|---|---|---|---|---|---|---|---|---|---|---|---|---|
| After UV curing (Plaques) | | | | | | | | | | | | | | |
| Speed of the belt: 65 ft/min | | | | | | | 65 ft/min | | | | | | | |
| Number of passes: One | | | | | | | One | | | | | | | |
| Stress at Break, MPa | 8.8 | 10.5 | 9.6 | 9.5 | | | | 9.9 | 10.6 | 10.6 | 10.0 | | 12.3 | 11.5 |
| Elongation at break, (%) | 732 | 778 | 800 | 779 | | | | 811 | 802 | 786.0 | 843.0 | | 759.0 | 914.0 |
| Peak stress, (MPa) | | | | | 9.8 | 10.4 | 11.0 | | | | | 8.9 | | |
| Peak Elongation, (%) | | | | | 800 | 780 | 780 | | | | | 860.0 | | |
| 100% Mod. (MPa) | 1.9 | 2 | 1.8 | 1.8 | 1.7 | 1.8 | 1.9 | 1.6 | 1.7 | 1.8 | 1.9 | 1.7 | 2.6 | 2.3 |
| After UV curing (Plaques) | | | | | | | | | | | | | | |
| Speed of the belt: 65 ft/min | | | | | | | 65 ft/min | | | | | | | |
| Number of passes: Two | | | | | | | Two | | | | | | | |
| Stress at Break, MPa | 9.7 | 11.3 | 10.3 | 10.7 | 11.3 | 10.0 | 10.4 | 10.5 | 10.7 | 11.0 | 10.1 | | 13.6 | 11.0 |
| Elongation at break, (%) | 735 | 791 | 797 | 801 | 809 | 794 | 771 | 786 | 805 | 822.0 | 848.0 | | 770.0 | 844.0 |
| 100% Mod. (MPa) | 2 | 2 | 1.8 | 1.9 | 1.8 | 1.8 | 1.9 | 1.7 | 1.7 | 1.7 | 1.9 | 1.8 | 2.6 | 2.2 |

Table 4: Mechanical properties of cured and uncured film samples.

TABLE 4

Mechanical properties of cured and uncured film samples.

| Film Properties | Comparative 1 | 2 | 3 | 4 | 5 | 6 | 7 | 8 | 9 | 10 | Comparative 11 | 12 | 13 | Comparative 14 |
|---|---|---|---|---|---|---|---|---|---|---|---|---|---|---|
| Molding Temp, F. | 350 | 350 | 350 | 350 | 350 | 350 | 350 | 350 | 350 | 350 | 350 | 350 | 350 | 350 |
| Before UV crosslinking | | | | | | | | | | | | | | |
| Stress at Break, psi | 668 | 1424 | 1360 | 1433 | 1444 | 1118 | 1275 | 1446 | 1390 | 1462 | 1476 | 1254 | 2133 | 1751 |
| Elongation at break, (%) | 871 | 1350 | 1289 | 1263 | 1307 | 1181 | 1246 | 1364 | 1343 | 1342 | 1419 | 1416 | 1356 | 1420 |
| 100% Mod. (MPa) | 240 | 244 | 228 | 244 | 234 | 227 | 233 | 223 | 214 | 235 | 256 | 222 | 344 | 484 |
| Energy at Break, in*lbf | 5.3 | 12.1 | 11.5 | 11.9 | 12.1 | 9.2 | 10.6 | 12.7 | 11.8 | 12.6 | 14.5 | 12.3 | 20.2 | 20 |
| UV crosslinked | | | | | | | | | | | | | | |
| Speed of the belt (65 ft/min) | 65 ft/min | | | | | | | | | | | | | |
| Number of passes (One) | One | | | | | | | | | | | | | |
| Stress at Break, psi | 1388 | 1330 | sample lost during UV test | 1516 | 1229 | 1474 | 1387 | 1020 | 1194 | 1250 | 1419 | 1409 | 11943 | 2200 |
| Elongation at break, (%) | 1273 | 1214 | | 1309 | 1253 | 1255 | 1263 | 1100 | 1232 | 1203 | 1358 | 1439 | 1216 | 1483 |
| 100% Mod., psi | 249 | 255 | | 234 | 229 | 242 | 243 | 228 | 220 | 241 | 244 | 228 | 342 | 331 |
| Energy at Break, in*lbf | 11.8 | 10.9 | | 12.3 | 10.3 | 12.1 | 11.7 | 8.3 | 10 | 10.4 | 13 | 13.5 | 16.6 | 23 |
| Speed of the belt (65 ft/min) | 65 ft/min | | | | | | | | | | | | | |
| Number of passes (Two) | Two | | | | | | | | | | | | | |
| Stress at Break, psi | 1246 | 1285 | 1300 | 1322 | 1185 | 1386 | 1361 | 993 | 1161 | 1210 | 1278 | 1336 | 1605 | 1788 |
| Elongation at break, (%) | 1159 | 1179 | 1235 | 1242 | 1135 | 1275 | 1262 | 1053 | 1170 | 1197 | 1263 | 1398 | 1183 | 1425 |
| 100% Mod., psi | 252 | 261 | 234 | 245 | 242 | 244 | 244 | 232 | 228 | 239 | 241 | 237 | 357 | 304 |
| Energy at Break, in*lbf | 10.1 | 10.6 | 10.6 | 10.9 | 9.4 | 11.6 | 11.1 | 7.7 | 9.5 | 10 | 11.3 | 13 | 14.4 | 18.9 |
| Speed of the belt (100 ft/min) | 100 ft/min | | | | | | | | | | | | | |
| Number of passes (Two) | Two | | | | | | | | | | | | | |
| Stress at Break, psi | 1401 | 1409 | 1316 | 1294 | 963 | 1196 | 1420 | 1048 | 1273 | 1215 | 1569 | 1311 | 1790 | 1670 |
| Elongation at break, (%) | 1260 | 1240 | 1246 | 1249 | 1084 | 1182 | 1273 | 1111 | 1256 | 154 | 1410 | 1379 | 1246 | 1412 |
| 100% Mod., psi | 248 | 262 | 238 | 233 | 224 | 242 | 240 | 232 | 223 | 231 | 247 | 236 | 317 | 318 |
| Energy at Break, in*lbf | 11.8 | 11.7 | 11 | 10.9 | 7.7 | 10 | 11.8 | 8.4 | 10.6 | 10.5 | 14.2 | 12.7 | 16.2 | 18.2 |

One objective of the invention is to achieve improved tensile strength without compromising elongation properties. As shown in Tables 2 and 3, Examples 3-7 containing a UV photoinitiator in addition to SLTD1060 and PP5341 exhibit both a higher stress at break (mPa) and also higher elongation at break (%) than the comparative composition without a UV photoinitiator (Example 1). Example 8, a composition containing Sartomer 350 and Irgafos 168 in addition to a UV photoinitiator, exhibits both higher stress at break and higher elongation at break before and after first-pass curing than Example 3, which does not contain Sartomer 350 or Irgafos 168. Example 13, with the addition of the EP copolymer MDV 91-9, exhibits improved stress at break properties after first-pass and second-pass curing when compared to Example 10, which does not contain MDV 91-9.

For purposes of convenience, various specific test procedures are identified above for determining certain properties such as tensile set, percent elongation at break, Shore A Hardness, and toughness. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

Having described the various aspects of the compositions herein, described in various numbered embodiments is:

A. A method for making a crosslinked composition comprising the steps of:
  (a) providing a composition comprising:
    (i) from about 60 to about 95 wt % of at least one propylene-based polymer comprising propylene-derived units and one or more dienes, the propylene-based polymer having a triad tacticity of from 50% to 99% and a heat of fusion of less than 80 J/g;
    (ii) from about 0.1 to about 15 wt % of at least one of multifunctional acrylates, multifunctional methacrylates, functionalized polybutadiene resins, functionalized cyanurate, and allyl isocyanurate;
    (iii) from about 0.1 to about 5 wt % of at least one of hindered phenols, phosphates, and hindered amines; and
    (iv) from about 0.1 to about 5 wt % of at least one photoinitiator, preferably a UV photoinitiator;
  (b) extruding the composition; and
  (c) crosslinking the composition, such as exposing to at least one of visible light, ultraviolet radiation, or x-ray radiation.

B. The method of Paragraph A, wherein the photoinitiator is a UV photoinitiator that is at least one of a benzophenone photoinitiator; a phenylglyoxylate photoinitiator; an alpha hydroxy ketone photoinitiator; a combination of acyl phosphine oxide and an alpha hydroxy ketone photoinitiator; 2,2-aimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

C. The method of Paragraph A or B, wherein the composition of step (a) comprises from about 1 to about 3 wt % of a UV photoinitiator.

D. The method of Paragraphs A-C, wherein the extruded composition is crosslinked using ultraviolet radiation at about 200 to about 350 nm.

E. The method of Paragraphs A-D, wherein the crosslinked composition after UV radiation has an Elongation at Break of at least about 700%.

F. The method of Paragraphs A-D, wherein the crosslinked composition after UV radiation has an Elongation at Break of at least about 800%.

G. The method of Paragraphs A-F, wherein the propylene-based polymer comprises from about 5 wt % to about 40 wt % of at least one of ethylene and butene units.

H. The method of Paragraphs A-G, wherein the propylene-based polymer of step (a) comprises from about 0.2 to about 4 wt % 5-ethylidene-2-norbornene.

I. A method for making a crosslinked composition comprising the steps of:
  (a) providing a composition comprising:
    (i) at least one propylene-based polymer comprising propylene-derived units and optionally one or more dienes, the propylene-based polymer having a triad tacticity of from 50% to 99% and a heat of fusion of less than 80 J/g;
    (ii) from about 0.1 to about 5 wt % of at least one ultraviolet photoinitiator selected from the group consisting of a benzophenone photoinitiator; a phenylglyoxylate photoinitiator; an alpha hydroxy ketone photoinitiator; a combination of acyl phosphine oxide and an alpha hydroxy ketone photoinitiator; 2,2-aimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester;
  (b) extruding the composition; and
  (c) crosslinking the composition, preferably using ultraviolet radiation.

J. The method of Paragraph I, wherein the propylene-based polymer of step (a) comprises from about 0.1 to about 10 wt % of a diene.

K. The method of Paragraph J or I, wherein the propylene-based polymer of step (a) comprises from about 0.1 to about 5 wt % of a diene.

L. The method of Paragraphs I-K, wherein the extruded composition is crosslinked using ultraviolet radiation at about 200 to about 350 nm.

M. The method of Paragraphs I-L, wherein the crosslinked composition after UV radiation has an Elongation at Break of at least about 700%.

N. A method for making a crosslinked composition comprising the steps of:
  (a) providing a composition comprising:
    (i) from about 60 to about 95 wt % of at least one propylene-based polymer comprising propylene-derived units and one or more dienes, the propylene-based polymer having a triad tacticity of from 50% to 99% and a heat of fusion of less than 80 J/g;
    (ii) from about 1 to about 20 wt % of an olefinic thermoplastic resin, preferably at least one of a polypropylene homopolymer and polypropylene-ethylene copolymer; and
    (iii) from about 0.1 to about 5 wt % of at least one photoinitiator, preferably a UV photoinitiator;
  (b) extruding the composition; and
  (c) crosslinking the composition, such as exposing to at least one of visible light, ultraviolet radiation, or x-ray radiation.

O. The method of Paragraph N, wherein the composition of step (a) further comprises from about 0.1 to about 15 wt % of at least one of multifunctional acrylates, multifunctional methacrylates, functionalized polybutadiene resins, functionalized cyanurate, and allyl isocyanurate.

P. The method of Paragraph N or O, wherein the composition of step (a) further comprises from about 0.1 to about 5 wt % of at least one of hindered phenols, phosphates, and hindered amines.

Q. The method of Paragraph N or O, wherein the composition of step (a) comprises from about 1 to about 10 wt % of a polypropylene homopolymer.

R. The method of Paragraphs N-Q, wherein the composition of step (a) comprises from about 2 to about 7 wt % of a polypropylene-ethylene copolymer, and the polypropylene-ethylene copolymer comprises about 50 wt % to about 70 wt % of ethylene-derived units.

S. The method of Paragraphs N-Q, wherein the composition of step (a) comprises from about 2 to about 7 wt % of a polypropylene-ethylene copolymer, and the polypropylene-ethylene copolymer comprises about 2 wt % to about 5 wt % of ethylene-derived units.

T. The method of Paragraphs N-S, wherein the crosslinked composition after UV radiation has an Elongation at Break of at least about 700%.

U. An article made from the composition of any of the preceding claims.

V. The method of Paragraph A, wherein the composition of step (a) is crosslinked after being extruded.

W. The method of Paragraph A, wherein the composition of step (a) is crosslinked before being extruded.

X. The method of Paragraph A, wherein the composition of step (a) is crosslinked while being extruded.

Y. The method of Paragraph A, further comprising a step of crosslinking the composition using electron beam radiation at an e-beam dose of about 200 KGy or less before, simultaneously with, or after ultraviolet or x-ray radiation.

What is claimed is:

1. A method for making a crosslinked composition comprising the steps of:
    (a) providing a composition comprising:
        (i) from about 60 to about 95 wt % of at least one propylene-based polymer comprising propylene-derived units and one or more dienes, the propylene-based polymer having a triad tacticity of from 50% to 99% and a heat of fusion of less than 80 J/g;
        (ii) from about 0.1 to about 15 wt % of at least one of multifunctional acrylates or multifunctional methacrylates;
        (iii) from about 0.1 to about 5 wt % of at least one of hindered phenols, phosphates, and hindered amines; and
        (iv) from about 0.1 to about 5 wt % of at least one photoinitiator;
    (b) extruding the composition; and
    (c) crosslinking the composition.

2. The method of claim 1, wherein the at least one photoinitiator is an ultraviolet (UV) photoinitiator.

3. The method of claim 2, wherein the at least one UV photoinitiator is at least one of a benzophenone photoinitiator; a phenylglyoxylate photoinitiator; an alpha hydroxy ketone photoinitiator; a combination of acyl phosphine oxide and an alpha hydroxy ketone photoinitiator; 2,2-dimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

4. The method of claim 2, wherein the composition of step (a) comprises from about 1 to about 3 wt % of a UV photoinitiator.

5. The method of claim 1, wherein the extruded composition is crosslinked by at least one of visible light, ultraviolet radiation, and gamma radiation.

6. The method of claim 1, wherein the extruded composition is crosslinked using ultraviolet radiation at about 200 to about 350 nm.

7. The method of claim 1, wherein the crosslinked composition has an Elongation at Break of at least about 700%.

8. The method of claim 1, wherein the at least one propylene-based polymer comprises from about 5 wt % to about 40 wt % of at least one of ethylene and butene units.

9. The method of claim 1, wherein the at least one propylene-based polymer of step (a) comprises from about 0.2 to about 4 wt % 5-ethylidene-2-norbornene.

10. A method for making a crosslinked composition comprising the steps of:
    (a) providing a composition comprising:
        (i) at least one propylene-based polymer comprising propylene-derived units and diene-derived units, the propylene-based polymer having a triad tacticity of from 50% to 99% and a heat of fusion of less than 80 J/g;
        (ii) from about 0.1 to about 5 wt % of at least one ultraviolet photoinitiator selected from the group consisting of a benzophenone photoinitiator; a phenylglyoxylate photoinitiator; an alpha hydroxy ketone photoinitiator; a combination of acyl phosphine oxide and an alpha hydroxy ketone photoinitiator; 2,2-dimethoxy-1,2-diphenylethan-1-one; and a combination of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester;
        (iii) from about 0.1 to about 15 wt % of at least one of multifunctional acrylates or multifunctional methacrylates; and
        (iv) from about 0.1 to about 5 wt % of at least one of hindered phenols, phosphates, and hindered amines;
    (b) extruding the composition; and
    (c) crosslinking the composition using ultraviolet radiation.

11. The method of claim 10, wherein the propylene-based polymer of step (a) comprises from about 0.1 to about 10 wt % of a diene.

12. The method of claim 10, wherein the extruded composition is crosslinked using ultraviolet radiation at about 200 to about 350 nm.

13. The method of claim 10, wherein the crosslinked composition after UV radiation has an Elongation at Break of at least about 700%.

14. A method for making a crosslinked composition comprising the steps of:
    (a) providing a composition comprising:
        (i) from about 60 to about 95 wt % of at least one propylene-based polymer comprising propylene-derived units and one or more dienes, the propylene-based polymer having a triad tacticity of from 50% to 99% and a heat of fusion of less than 80 J/g;
        (ii) from about 1 to about 20 wt % of a at least one of a polypropylene homopolymer and polypropylene-ethylene copolymer;
        (iii) from about 0.1 to about 5 wt % of at least one ultraviolet photoinitiator;

(iv) from about 0.1 to about 15 wt % of at least one of multifunctional acrylates or multifunctional methacrylates; and (v) from about 0.1 to about 5 wt % of at least one of hindered phenols, phosphates, and hindered amines;

(b) extruding the composition; and (c) crosslinking the composition using ultraviolet radiation.

15. The method of claim 14, wherein the composition of step (a) comprises from about 1 to about 10 wt % of a polypropylene homopolymer.

16. The method of claim 14, wherein the composition of step (a) comprises from about 2 to about 7 wt % of a polypropylene-ethylene copolymer, and the polypropylene-ethylene copolymer comprises about 50 wt % to about 70 wt % of ethylene-derived units.

17. The method of claim 14, wherein the composition of step (a) comprises from about 2 to about 7 wt % of a polypropylene-ethylene copolymer, and the polypropylene-ethylene copolymer comprises about 2 wt % to about 5 wt % of ethylene-derived units.

18. The method of claim 14, wherein the crosslinked composition after UV radiation has an Elongation at Break of at least about 700%.

19. The method of claim 1, wherein the composition of step (a) is crosslinked after being extruded.

20. The method of claim 1, wherein the composition of step (a) is crosslinked before being extruded.

21. The method of claim 1, wherein the composition of step (a) is crosslinked while being extruded.

22. The method of claim 1, further comprising a step of crosslinking the composition using electron beam radiation at an e-beam dose of about 200 KGy or less before, simultaneously with, or after ultraviolet radiation.

\* \* \* \* \*